Inventors
Carl G. Casper
Clarence Casper

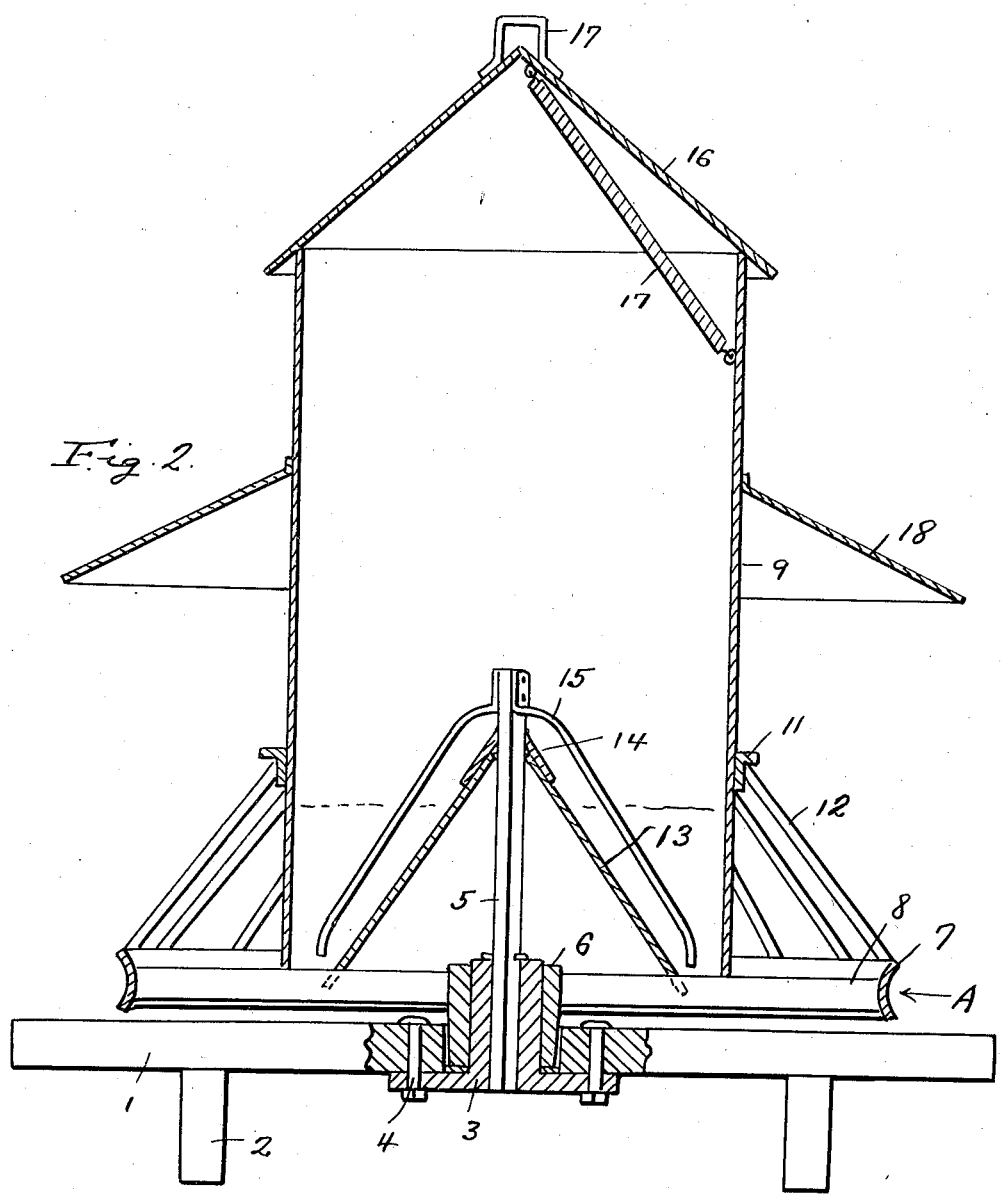

Patented Apr. 4, 1939

2,153,455

UNITED STATES PATENT OFFICE 2,153,455

ROTARY LIVESTOCK FEEDER

Carl G. Casper and Clarence Casper, Kenton, Ohio

Application April 15, 1938, Serial No. 202,308

3 Claims. (Cl. 119—54)

This invention relates to a rotary live stock feeder, the general object of the invention being to provide a horizontally arranged wheel rotatably supported on a platform with the spokes of the wheel forming a plurality of feeding compartments on the platform, a hopper carried by the wheel and delivering the feed to the compartments, and means whereby movement of the animals feeding from the device will cause rotary movement of the wheel and hopper to cause the feed to pass from the hopper into the compartments, and said hopper having an agitator therein for insuring movement of the feed from the hopper into the compartments.

Another object of the invention is to so form the spokes of the wheel that the feed will be distributed into the compartments by movement of the wheel.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 2 is a vertical sectional view through the invention, with parts in elevation.

Figure 1:
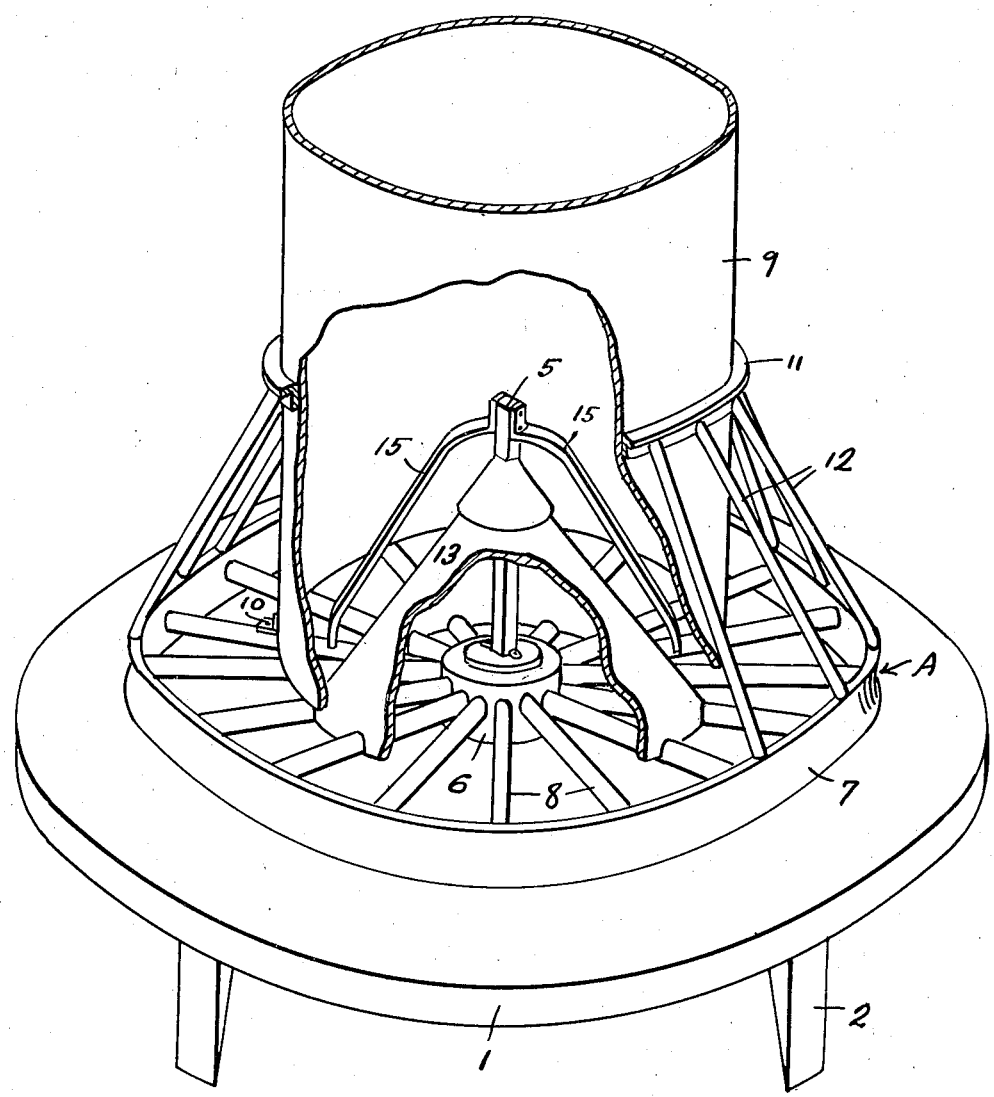
Figure 1 is a perspective view of the invention, with parts broken away to show interior parts.

In these drawings, the numeral 1 indicates a circular platform provided with the legs 2 which are, of course, of a length to accord with the sizes of the animals to be fed by the apparatus. A flanged bushing 3 passes through a hole in the center of the platform and has its flange bolted to the under side of the platform by the bolts 4. The bore of the bushing is of non-circular shape to receive the lower end of a shaft 5 of similar non-circular cross sectional shape so that the shaft is stationary. A horizontally arranged wheel A has its hub 6 rotatably arranged on the bushing and the rim 7 of the wheel is of arcuate shape in cross section with its convex face innermost and the spokes 8 of the wheel are each of substantially elliptical shape in cross section so as to increase their vertical width. These spokes, of course, radiate from the hub and the space between each pair of spokes forms a feeding compartment on the platform.

A vertically arranged cylinder 9 forms a hopper for the feed and has its lower end resting on intermediate parts of the spokes, and the lower end of the hopper is connected to certain of the spokes by the brackets 10 so that the hopper will rotate with the wheel. As will be seen the hopper is of much less diameter than that of the wheel. A ring 11 of angle shape in cross section is carried by the hopper and bars 12 have their ends fastened to said ring and to the upper edge of the rim, these bars sloping downwardly and outwardly, and said bars are arranged over the spokes, there being as many bars as there are spokes. The base of a cone 13 rests on the spokes and is located in the lower part of the hopper and has an opening in its apex for the passage of the shaft 5, the opening being large enough to permit the cone to rotate with the wheel. The base of the cone is formed with notches through which the spokes pass. A cap or collar 14 is carried by the upper portion of the shaft and fits over the upper end of the cone to prevent any of the feed entering the cone. Downwardly and outwardly extending agitator bars 15 have their upper ends attached to the upper end of the shaft 5 and extend into the space between the cone and the lower end of the hopper so as to agitate the feed in the hopper to insure the feed passing from the hopper into the compartments formed by the spokes and the bars 12. These bars are preferably arranged as shown in Figures 1 and 2.

A conical cover 16 is provided for the hopper and is held in covering position by a coiled spring 17 having one end suitably connected with the interior of the upper portion of the hopper and its other end connected with the upper part of the cover, and said cover is provided with a handle 17 for permitting it to be removed from the hopper so that feed can be placed in the hopper, after which the cover is put back in place. A canopy 18 is attached to the hopper and extends over the feeding compartments of the device to protect the same from the elements.

As will be understood, when feed is placed in the hopper, some of this feed will enter the compartments formed by the spokes of the wheel and the bars 12 and as the animals feed from these compartments, they will strike the bars 12, which will cause the wheel, the hopper and the cone 13 to partly rotate, and this will cause more feed to pass from the hopper into the compartments, and the movement of this feed is insured by the stationary agitator arms 15. The wide spokes 8 will cause movement of the feed outwardly toward the rim during movement of the wheel and the cone prevents the feed from moving toward the hub and protects the hub and bearing bushing.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A feeder of the class described comprising a platform, a horizontally arranged wheel provided with spokes rotatably supported on the platform, a hopper carried by the wheel, and bars extending upwardly and inwardly from the rim of the wheel to the hopper, each bar being arranged above a spoke of the wheel.

2. A feeder of the class described comprising a platform, a horizontally arranged wheel provided with spokes rotatably supported on the platform, a hopper carried by the wheel, bars extending upwardly and inwardly from the rim of the wheel to the hopper, each bar being arranged above a spoke of the wheel, a cone in the lower end of the hopper and engaging the spokes of the wheel, and a stationary agitator in the lower end of the hopper between the cone and the hopper.

3. A feeder of the class described comprising a platform, a stationary shaft carried by the platform and extending upwardly, a horizontally arranged wheel provided with spokes rotatably supported on the platform and having its hub surrounding the shaft, a hopper supported on the wheel and of much less diameter than that of the wheel, the shaft extending into the lower part of the hopper, bars connecting the rim of the wheel with the hopper and said bars sloping upwardly and inwardly, and each bar being arranged above a spoke of the wheel, said bars and said spokes forming feeding compartments, deflector means in the lower end of the hopper, and stationary agitating means in the lower part of the hopper and carried by the shaft.

CARL G. CASPER.
CLARENCE CASPER.